United States Patent
Vivek et al.

(10) Patent No.: US 9,021,845 B2
(45) Date of Patent: May 5, 2015

(54) ELECTRICALLY DRIVEN RAPIDLY VAPORIZING FOILS, WIRES AND STRIPS USED FOR COLLISION WELDING AND SHEET METAL FORMING

(71) Applicant: The Ohio State University, Columbus, OH (US)

(72) Inventors: Anupam Vivek, Columbus, OH (US); Glenn S. Daehn, Columbus, OH (US); Geoffrey A. Taber, Columbus, OH (US); Jason R. Johnson, Columbus, OH (US)

(*) Notice: Subject to any disclaimer, the term of this patent is extended or adjusted under 35 U.S.C. 154(b) by 238 days.

(21) Appl. No.: 13/838,556

(22) Filed: Mar. 15, 2013

(65) Prior Publication Data

US 2013/0283878 A1    Oct. 31, 2013

Related U.S. Application Data

(60) Provisional application No. 61/620,500, filed on Apr. 5, 2012.

(51) Int. Cl.
| | |
|---|---|
| *B21D 26/08* | (2006.01) |
| *B23P 19/00* | (2006.01) |
| *B21D 26/021* | (2011.01) |
| *B23K 20/08* | (2006.01) |

(52) U.S. Cl.
CPC .......... *B21D 26/021* (2013.01); *B23K 20/08* (2013.01); *Y10S 72/707* (2013.01)

(58) Field of Classification Search
USPC .......... 72/54, 56, 430, 707; 29/419.2, 421.1; 228/3.1, 115, 596, 896.6
See application file for complete search history.

(56) References Cited

U.S. PATENT DOCUMENTS

| | | | |
|---|---|---|---|
| 3,640,110 A * | 2/1972 | Inoue ............................... | 72/56 |
| 4,746,054 A * | 5/1988 | Moats et al. ................. | 29/421.1 |
| 6,098,548 A | 8/2000 | Rink et al. | |
| 7,516,634 B1 * | 4/2009 | Golovashchenko et al. ...... | 72/54 |
| 2009/0098404 A1 | 4/2009 | Matsuyama | |
| 2010/0108253 A1 | 5/2010 | Doane et al. | |
| 2011/0000953 A1 | 1/2011 | Daehn et al. | |

OTHER PUBLICATIONS

Woodward, S. Springback Callibration of Sheet Metal Components Using Impulse Forming Methods, Thesis, Ohio State University, 2011.
Vivek A., Taber, G.A., Johnson, J.R., Woodward, S.T., Daehn, G.S., Electrically Driven Plasma via Vaporization of Metallic Conductors: A Tool for Impulse Metal Working, Journal of Materials Processing Technology, Feb. 2, 2013.

\* cited by examiner

*Primary Examiner* — David B Jones
(74) *Attorney, Agent, or Firm* — Standley Law Group LLP

(57) ABSTRACT

A method for forming a piece of a sheet metal is performed by positioning a consumable body, made of metal, proximate to the piece of the sheet metal. The consumable body is rapidly vaporized, and the gas pressure generated thereby is directed into the piece of the sheet metal. This results in acceleration of the piece of sheet metal, and it is collided into a stationary body at a velocity, generally in excess of 200 m/s. Depending upon the type of stationary body, the piece of sheet metal is deformed into a predetermined shape or is welded onto the stationary body. The vaporization is accomplished by passing a high current of electricity into the consumable body. The effect of the vaporized metal may be augmented by additional components in the consumable body.

18 Claims, 14 Drawing Sheets

ELECTRICALLY DRIVEN RAPIDLY VAPORIZING FOILS, WIRES AND STRIPS USED FOR COLLISION WELDING AND SHEET METAL FORMING

STATEMENT REGARDING FEDERALLY-SPONSORED R & D

This invention was made with government support under Contract No. DE-AC04-94AL85000 awarded by The U.S. Department of Energy through Sandia National Laboratories. The government has certain rights in the invention.

CROSS-REFERENCE TO RELATED APPLICATIONS

This application is a non-provisional of U.S. 61/620,500, filed 5 Apr. 2012, the content of which is incorporated by reference as if fully recited herein.

TECHNICAL FIELD

The present invention is in the field of impulse metalworking. A new method for collision welding and impulse driven sheet metal forming has been developed based on pressure created from electrically driven rapid vaporization of thin conductors.

BACKGROUND

When a sheet of metal is accelerated to very high speed and an obstacle is placed in its path, then because of its inertia, it would conform into or around that obstacle. Hence the sheet forms into a certain shape if the obstacle is in the form of a female die, or shears if the obstacle is a sharp edge. It is also well known that collision of a fast travelling piece of metal with another can lead to a weld, if the impact velocity and angle are in an optimum range. Collision welds are generally observed when the impact velocity is in the range of 150 m/s to 500 m/s and the impact angle is between 5 to 20 degrees. Impulse metalworking has some distinct advantages over traditional quasi-static methods. Impulse forming leads to lower spring back, higher formability and can be implemented with single sided tooling. Impact welding has been shown to result in welds which are stronger than the parent materials. It is a solid state welding process with little or no heat affected zone because of which brittle intermetallics do not form. This process is widely used for joining dissimilar metals which are very difficult, sometimes impossible, to join by traditional fusion welding processes. The two most common agents for driving the metallic workpiece to high velocities are electromagnetic forces and explosives.

The electromagnetic launch of the workpiece is based on laws of electromagnetic induction and Lorentz forces. When a conductor, considered as secondary coil, is placed in proximity to another conductor, considered as primary coil, carrying a transient current, then a current opposing the change in magnetic field is induced in the former. These conductors carrying opposite currents repel each other and hence the workpiece gets accelerated to a high velocity. The primary coil is generally insulated from the workpiece by encapsulating it in an epoxy matrix. If the cycle times are low, the joule heat developed during the process can melt the epoxy material, leading to current shortage. There are also pressure limitations on the primary coil which depend on the mechanical strength of the epoxy as well as the coil material. Hence, the application of electromagnetic forming is limited at high energies and large numbers of operations by the availability of long-lived electromagnetic coils. Besides, the workpiece either has to be electrically conductive, or it has to be driven by a conductive flyer. Use of explosives for forming or welding has problems of its own. Their safe implementation in closed industrial settings is difficult. Also, they are mostly used for only for large scale applications and there is a high expenditure on infrastructure. Besides, there are government and OSHA regulations which limit the use of explosives.

SUMMARY

Some of the difficulties encountered with known electromagnetic and explosive metalworking techniques are resolved by the methods and devices as described below.

In one embodiment of a method for forming a piece of a sheet metal, a consumable body, comprising a metal, is positioned proximate to the piece of the sheet metal. The piece of sheet metal is accelerated by rapidly vaporizing the consumable body and directing the gas pressure generated by the rapidly-vaporized metal into the piece of the sheet metal. The accelerated piece of the sheet metal is collided into a stationary body, resulting in the formed piece of sheet metal.

In many embodiments of the method, the consumable body comprises a metal foil, although many other forms of metal, such as wire, mesh, etc are deemed useful for this purpose.

In one form of the method, the stationary body is a die and the piece of sheet metal is deformed by the collision to create a desired shape or surface structure. In another form of the method, the stationary body is a die that contains holes, such that the piece of sheet metal is perforated or sheared by the collision to create a desired hole or series of holes.

In a yet further method, the stationary body is a further piece of metal and the piece of sheet metal is welded thereto by the collision. In this type of embodiment, the piece of sheet metal and the further piece of metal can be dissimilar metals.

In any of these methods, the piece of sheet metal attains a velocity in the range of 200 to 2000 m/s during the accelerating step.

In many embodiments, aluminum, as well as its alloys, will be the metal foil in the consumable body.

When preparing the consumable body, some embodiments will further comprise a layer of an unstable energetic chemical mixture. This can be, for example, an oxidizer fuel mixture or an unstable compound such as nitromethane. One exemplary unstable energetic chemical mixture comprises kerosene oil and potassium chlorate. It is also possible in some situations to add a layer of a polyurethane elastomer to the consumable body, preferably on a face that is directed towards the piece of sheet metal to be accelerated. Such a polyurethane layer may be used with or without the unstable energetic chemical mixture.

In other embodiments, the consumable body comprises two layers of metal foil or mesh, with an intermediate layer of the unstable energetic chemical mixture.

The vaporizing of the consumable body may be achieved by passing a high current rapidly into the foil, particularly by discharging a capacitor or a bank of capacitors.

In many of these methods, the consumable body, the piece of sheet metal and the stationary body are arranged in that order between a pair of blocks of metal, each of which significantly outweighs the piece of sheet metal, thereby directing the vaporized stream towards the piece of sheet metal and accelerating the piece of sheet metal towards the stationary body.

BRIEF DESCRIPTION OF THE DRAWINGS

A better understanding of the invention will be had when reference is made to the accompanying drawings, wherein identical parts are identified with identical reference numerals and wherein.

DETAILED DESCRIPTION OF THE DRAWINGS

Figure 1A:
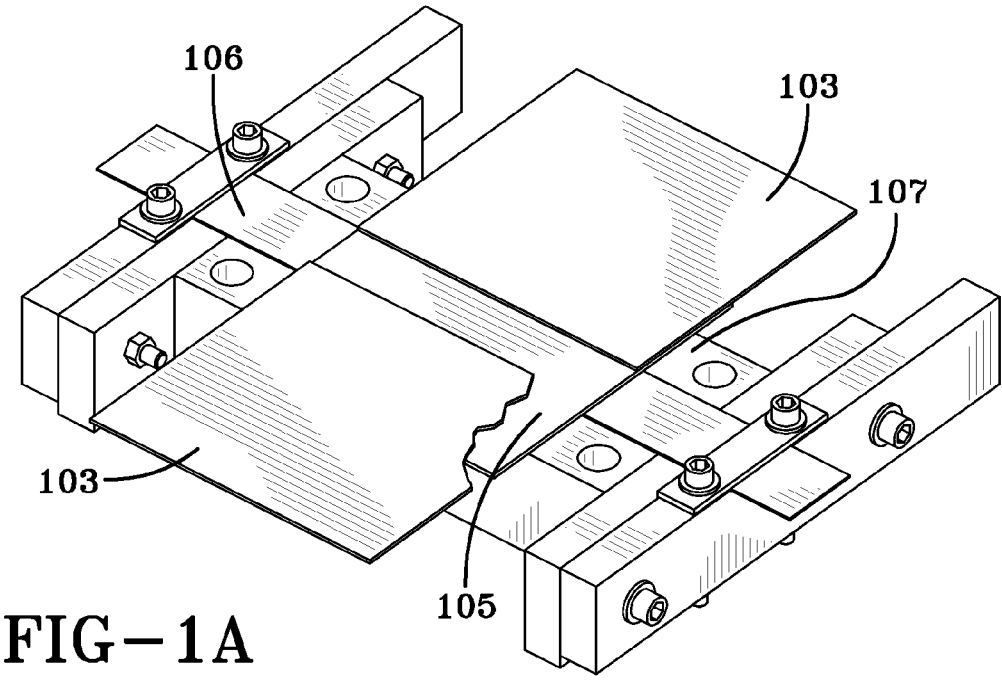
FIG. 1 shows photos of a set up for vaporizing foil collision welding.
Figure 1B:
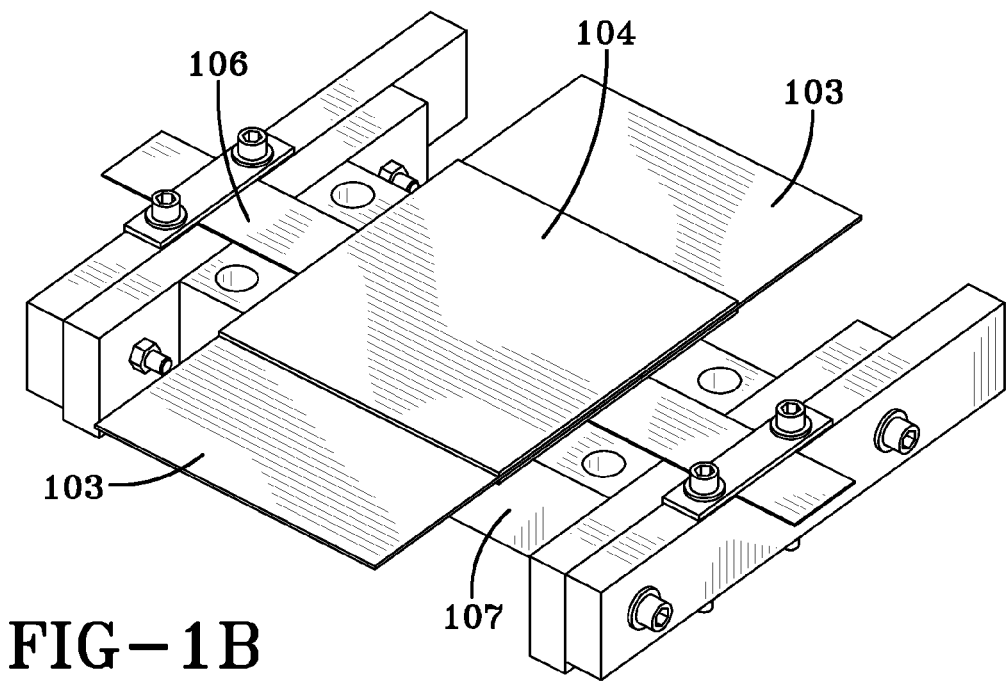
Figure 1C:
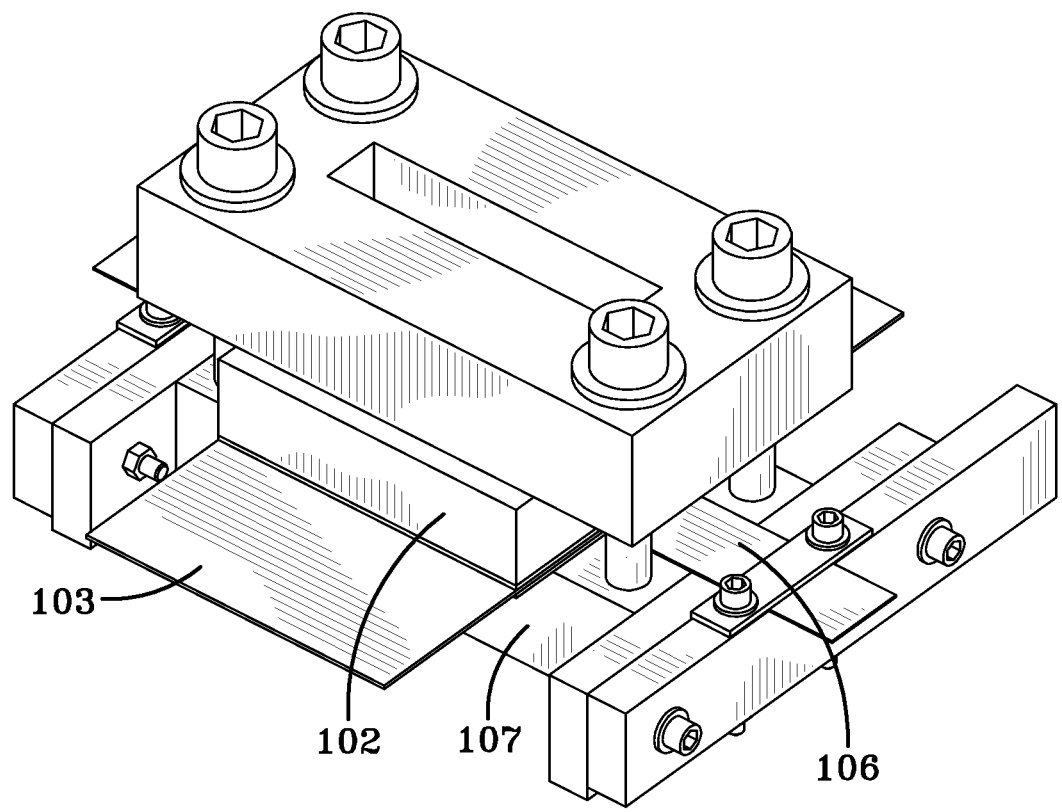
Figure 2A:
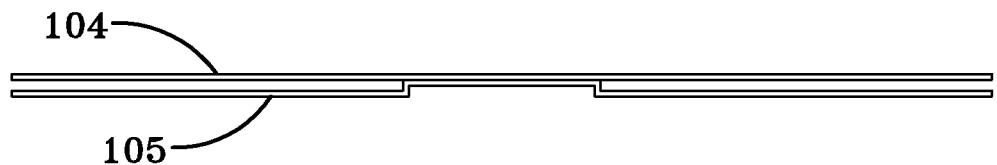
FIG. 2 shows photos of front and rear surfaces of a weld, where magnesium alloy AZ91 D is welded to aluminum alloy AA66061-T6.
Figure 2B:
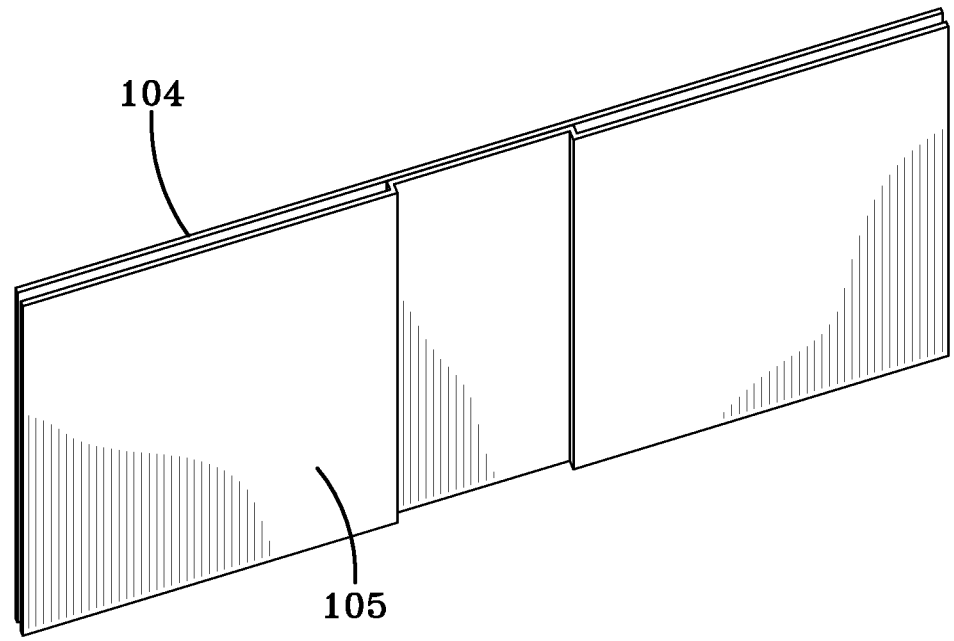
Figure 3A:
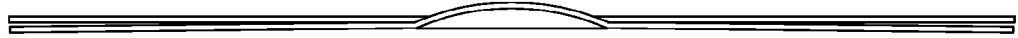
FIG. 3 shows photos of different welds obtained by the vaporizing foil method.
Figure 3B:
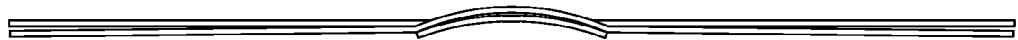
Figure 3C:
Figure 3D:

The actuator for this method is very robust and the consumable for every cycle is aluminum foil which is inexpensive. Also, while explosive forming is often done in unconstrained large environments, the present goal is to focus the energy into a relatively small confined region, providing a technique that could be practiced in a conventional factory environment.

A high amount of charge stored in a capacitor bank, when rapidly discharged across a thin conductor, instantly vaporizes the latter and causes a high pressure region around the area of vaporization. If directed properly, the gases or plasma created from this event can efficiently propel sheets, tubes etc. to very high speeds. In the present invention, thin aluminum foil is rapidly vaporized by passing a high current through it and the pressure created from this change of state is used to drive sheet metals to velocities in excess of 200 m/s. The sheet metal can subsequently be formed into a female die, or collision welded with another metallic target. For the forming application, an elastomer is used to uniformly distribute the pressure over a larger area. Also, small amounts of oxidizer-fuel mixtures have been detonated by using this method to augment the attainable pressure.

Collision Welding

A sheet metal is placed directly against an insulated aluminum foil whose ends are connected to the terminals of a capacitor bank. When the capacitor bank is discharged, a high current, on the order of 100 kAmps, flows through the foil in 10's of microseconds. The foil is backed by a heavy block of metal.

Hence when the foil vaporizes, all the reaction forces are towards the sheet metal and accelerate it to a high speed towards a target sheet which is stood-off at a certain distance. The standoff distances used with the current set up are 0.023" and 0.046". Upon impact the two metallic plates weld with each other. The flyer or target sheet may have surface features to ensure oblique impact, because flat impact prevents the phenomenon of jetting which is essential to collision welding. 2, 3 and 4 aluminum sheets have been welded together using this method in single shots. Also, dissimilar metal welds like aluminum-steel and magnesium-aluminum have been obtained using this method. This is very applicable to the automotive industry which is looking for ways to join lightweight materials like magnesium and aluminum with stronger structural metals like steel.

Impulse Forming

A layer of polyurethane (elastomer) between the vaporizing foil and the workpiece helps in transferring the pressure and distributing it over a larger area of the workpiece. Although the polyurethane is referred to as being part of the consumable body that accelerates the workpiece, it will be readily understood that, in many instances, the polyurethane will survive the process and be able to be re-used. As in the case of welding, in this setup also, an insulated aluminum foil is vaporized by passing a high amount of charge stored in a capacitor bank. Once the pressure wave created from rapid vaporization gets to the workpiece, it accelerates the latter to a velocity in excess of 200 m/s, almost instantly. The workpiece then gets formed into a die. Presently, aluminum alloys 3003-H14 have been extruded into a perforated steel sheet as shown in FIGS. 4 and 5.

Figure 4B:
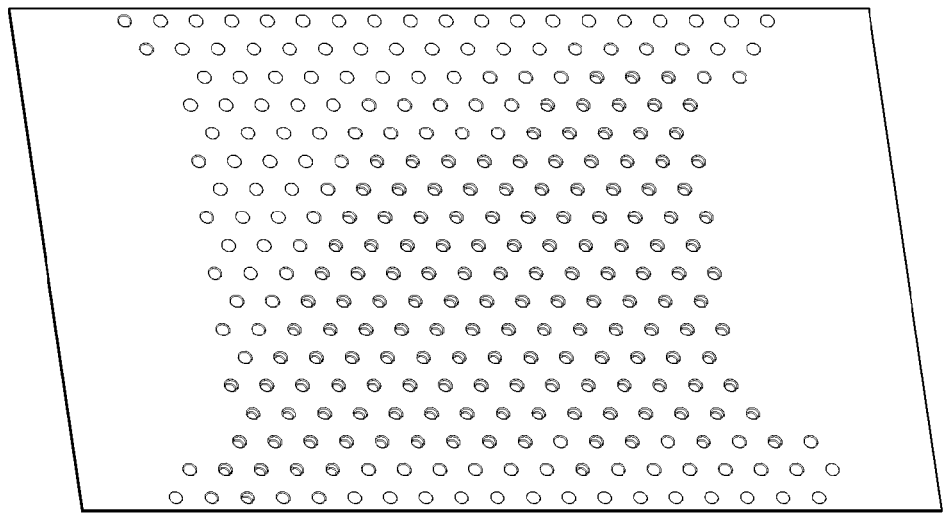
FIG. 4 shows photos of the front and back side of a 0.023 inch thick AA3003-H14 sheet formed by vaporizing a 0.005 inch thick wide aluminum foil with 5.6 kJ energy.
Figure 4A:
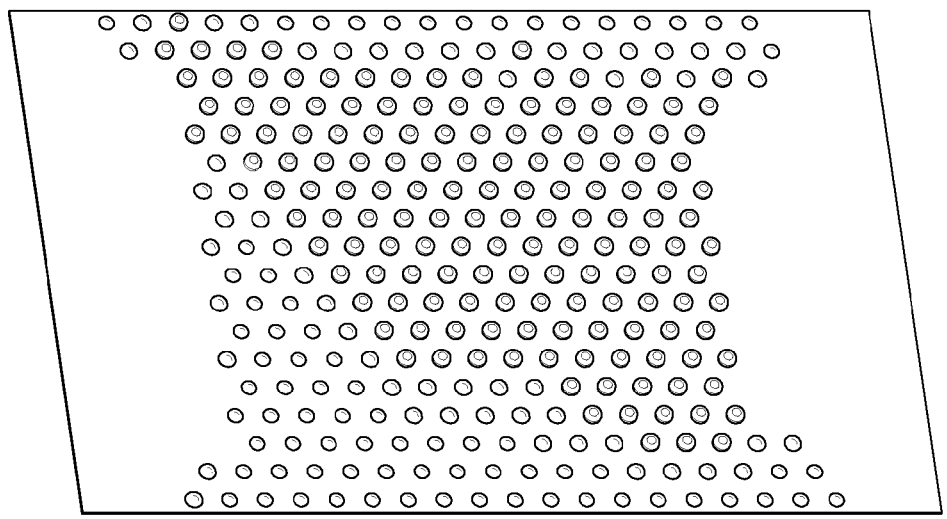
Figure 5B:
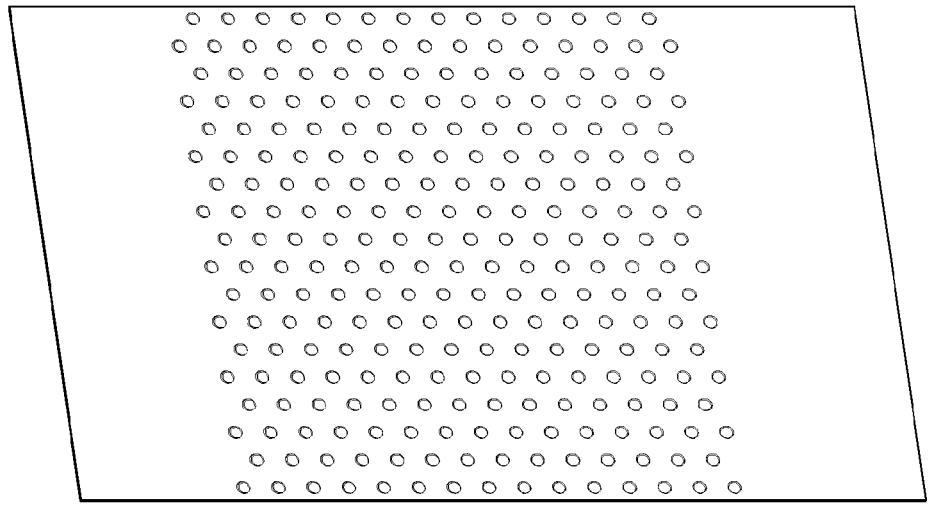
FIG. 5 shows photos of the front and back side of a 0.023 inch thick AA3003-H14 sheet formed by vaporizing a 0.005 inch thick wide aluminum foil with 6.4 kJ energy.
Figure 5A:
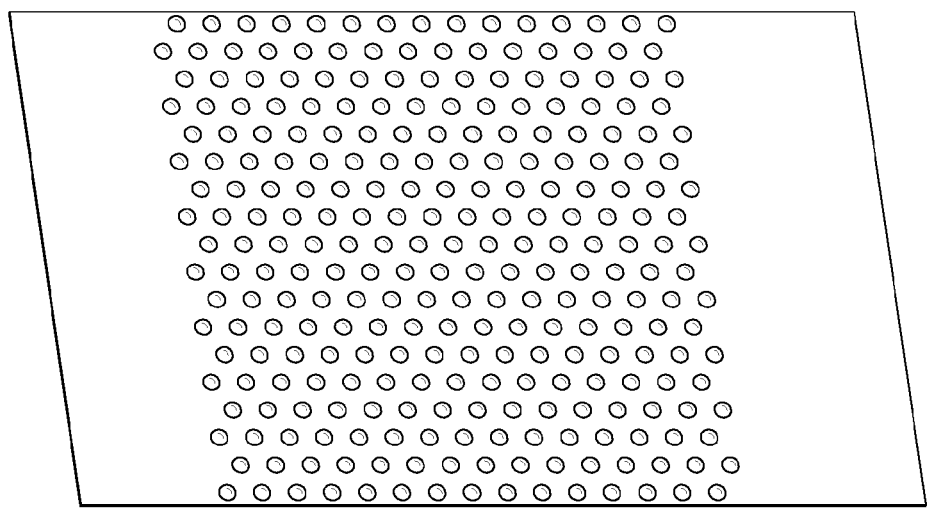
Figure 6A:
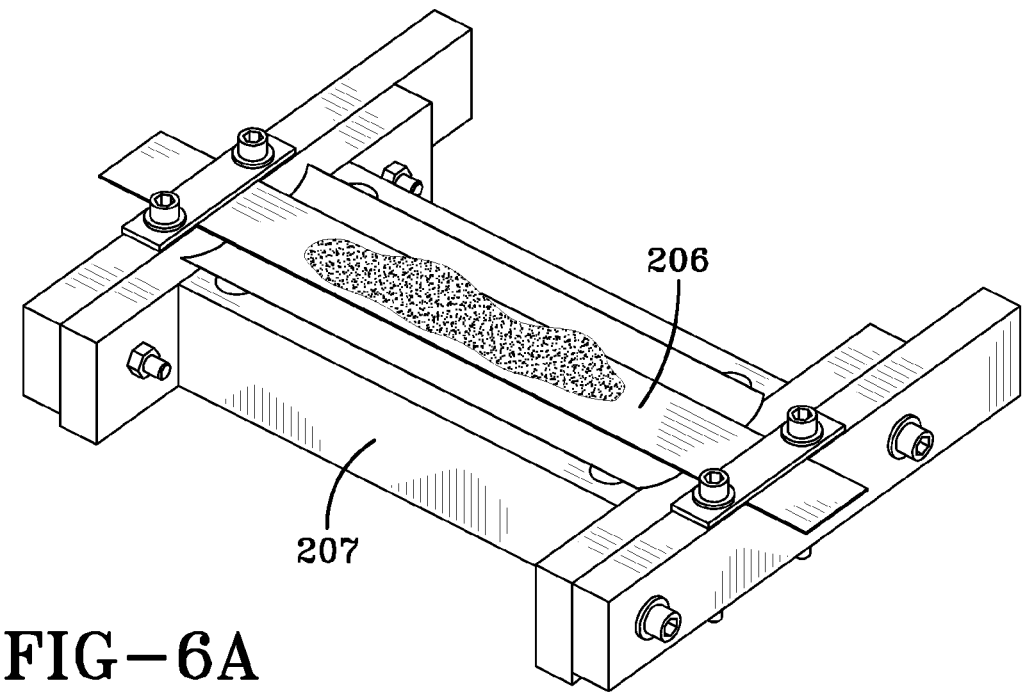
FIG. 6 shows the set up for augmented vaporizing foil forming into a perforated sheet.
Figure 6B:
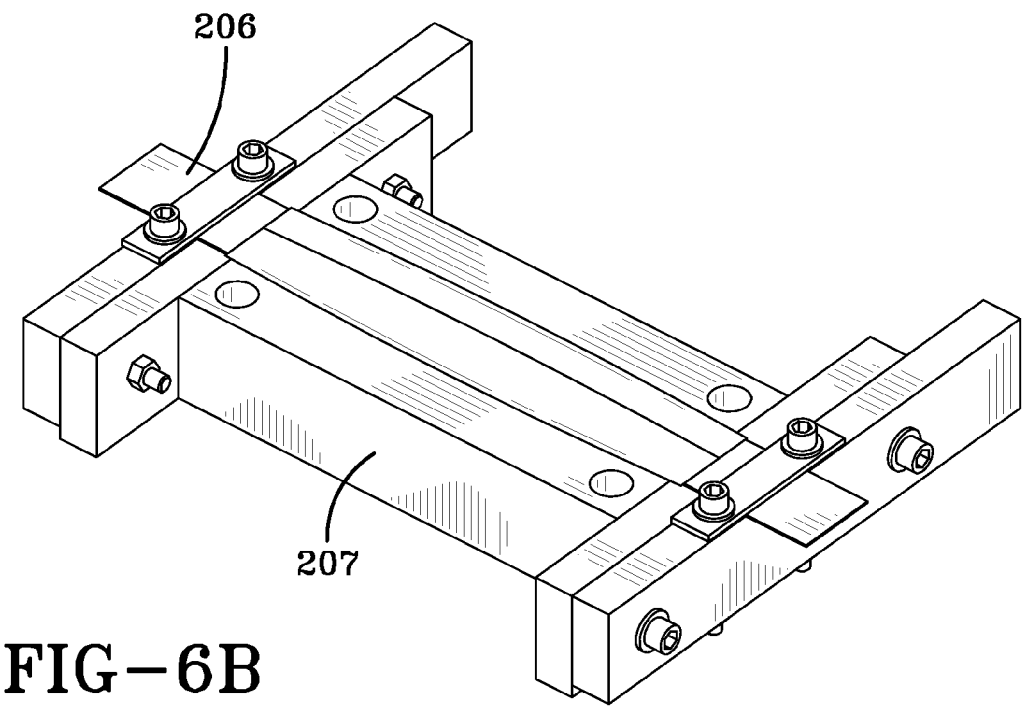
Figure 6C:
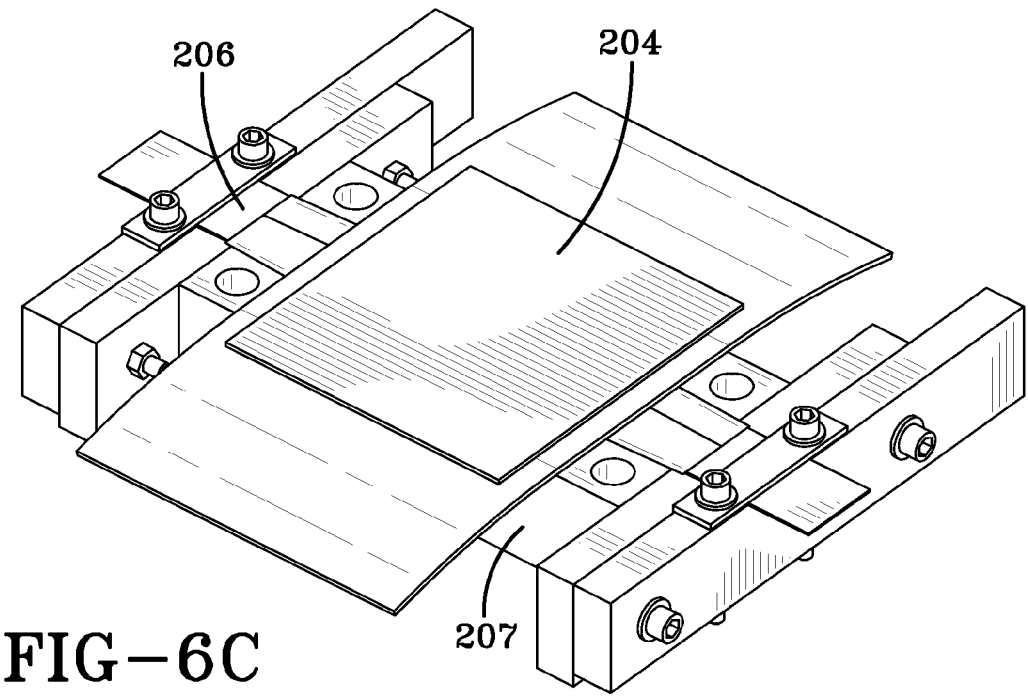
Figure 6D:
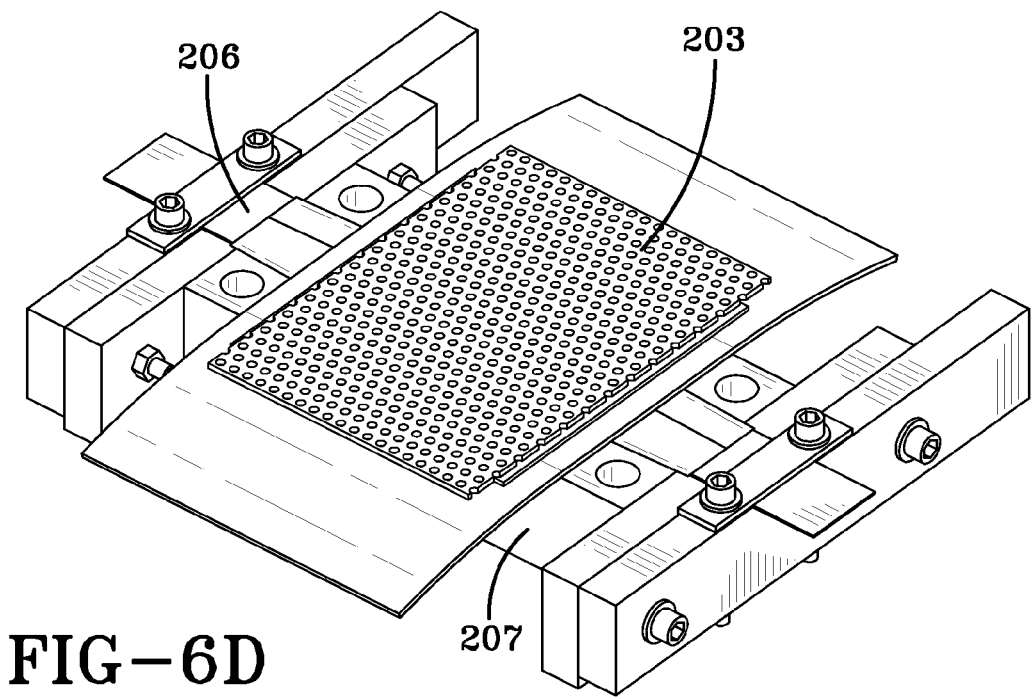

There are two noteworthy observations from FIGS. 4 and 5. First, tremendous pressures are being created and transferred into the workpieces. In order to get similar deformations in a traditional press, very high pressures will be required. Impact creates very high pressure in the present method. Second, the pressure is distributed in a much larger area than the area of the foil. This is enabled by using polyurethane as a pressure transfer medium.

Figure 7B:
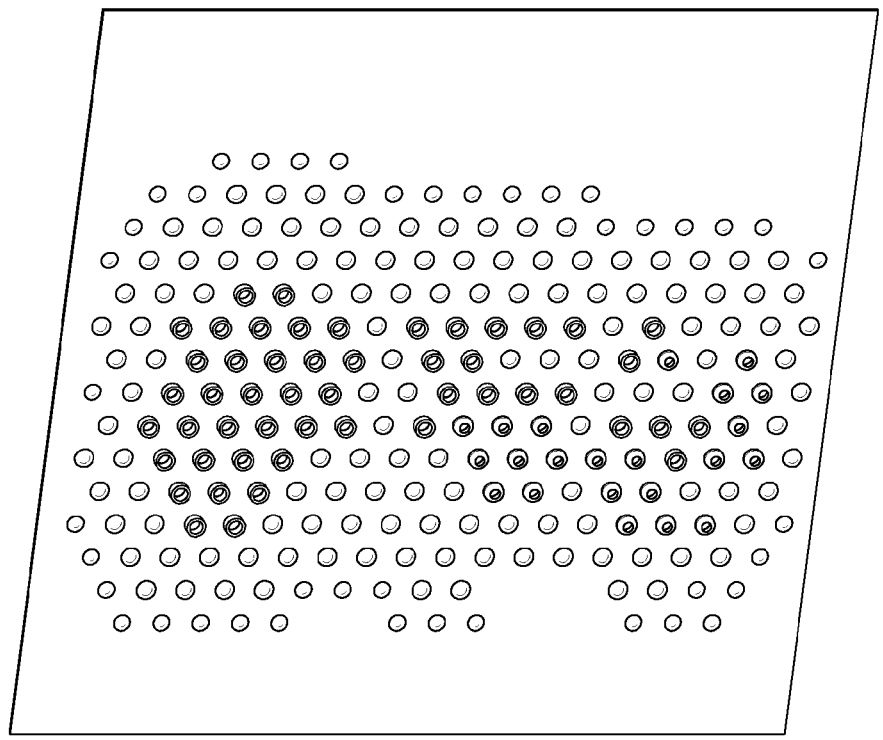
FIG. 7 shows photos of a 0.023 inch thick AA6061-T6 sheet formed into a perforated sheet (a) without augmentation, using 6.4 kJ input electrical energy and (b) with augmentation, using 4 kJ input electrical energy.
Figure 7A:
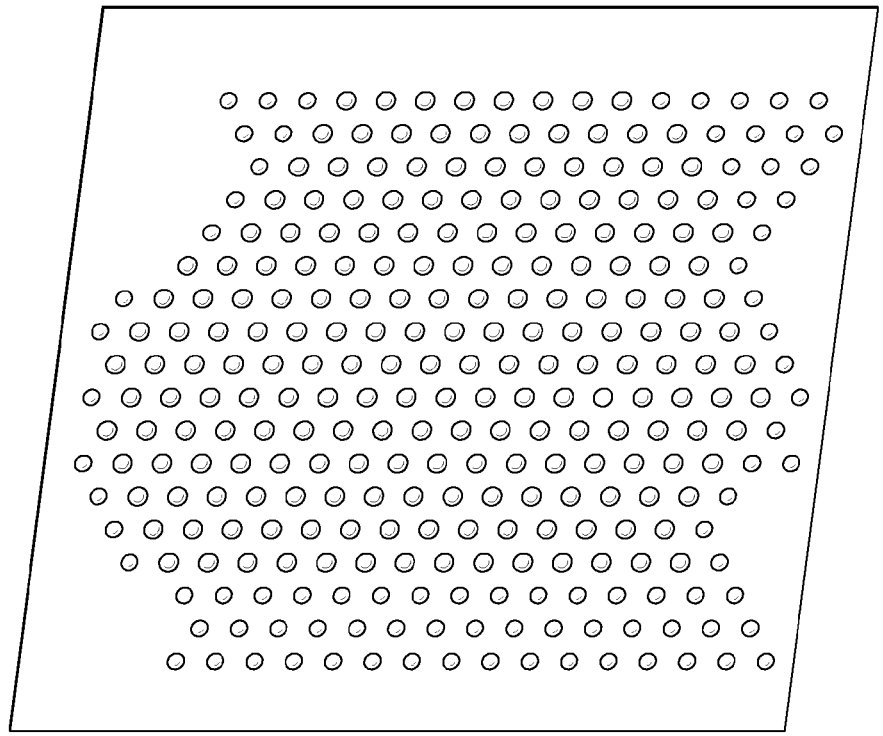

In order to get even higher pressures, an oxidizer fuel mixture can be placed between two layers of aluminum foil as shown in FIG. 6. The pressure created from vaporizing foils causes detonation of the mixture and leads to formation of even more gaseous products. Also, since the current is flowing in the same direction in both layers of foil, they are attracted towards each other by Lorentz forces and assist in increasing the detonation pressure on augment layer. As seen in FIG. 7, there is a significant increase in pressure by including an augment.

Figure 8A:
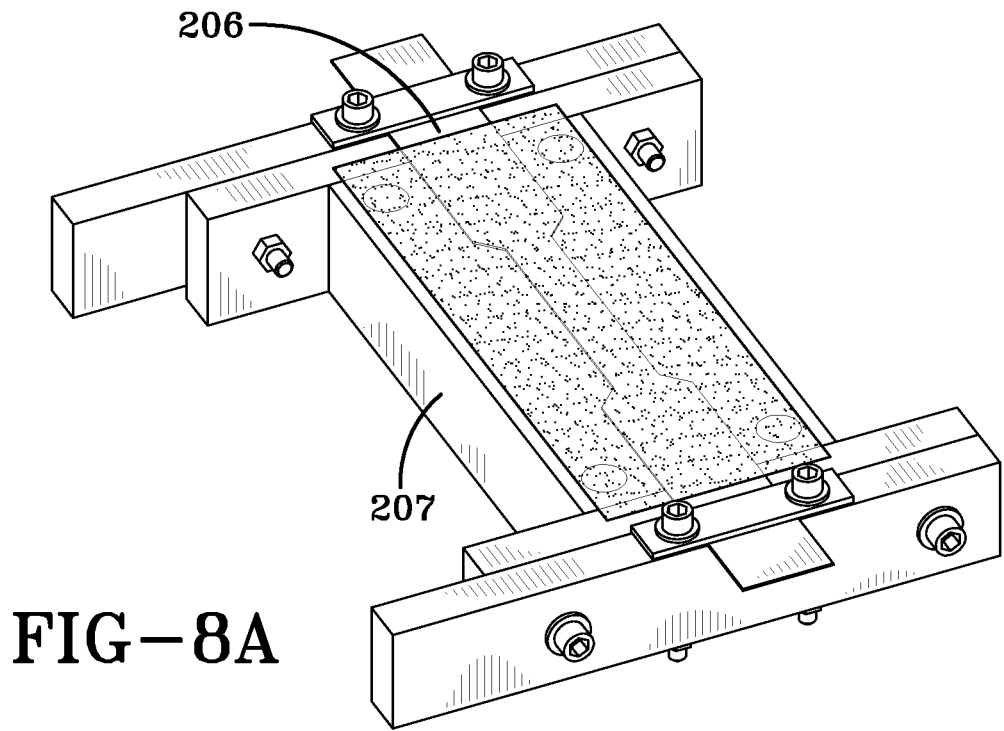
FIG. 8 shows the set up for non-augmented vaporizing foil-polyurethane pad forming into a cell phone die.
Figure 8B:
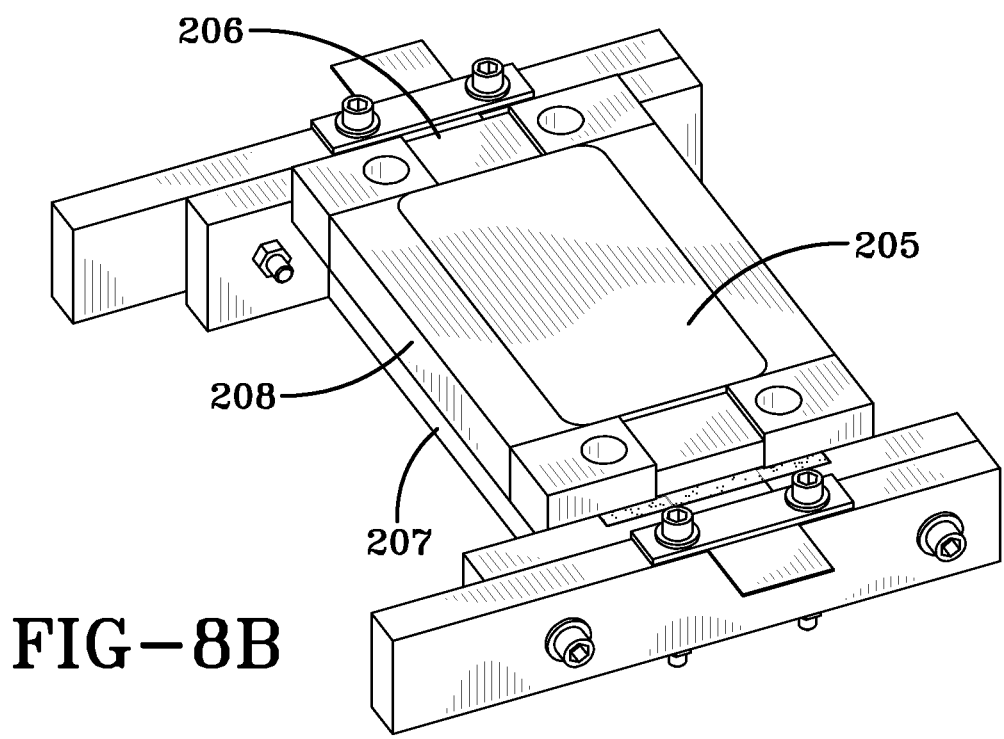
Figure 8C:
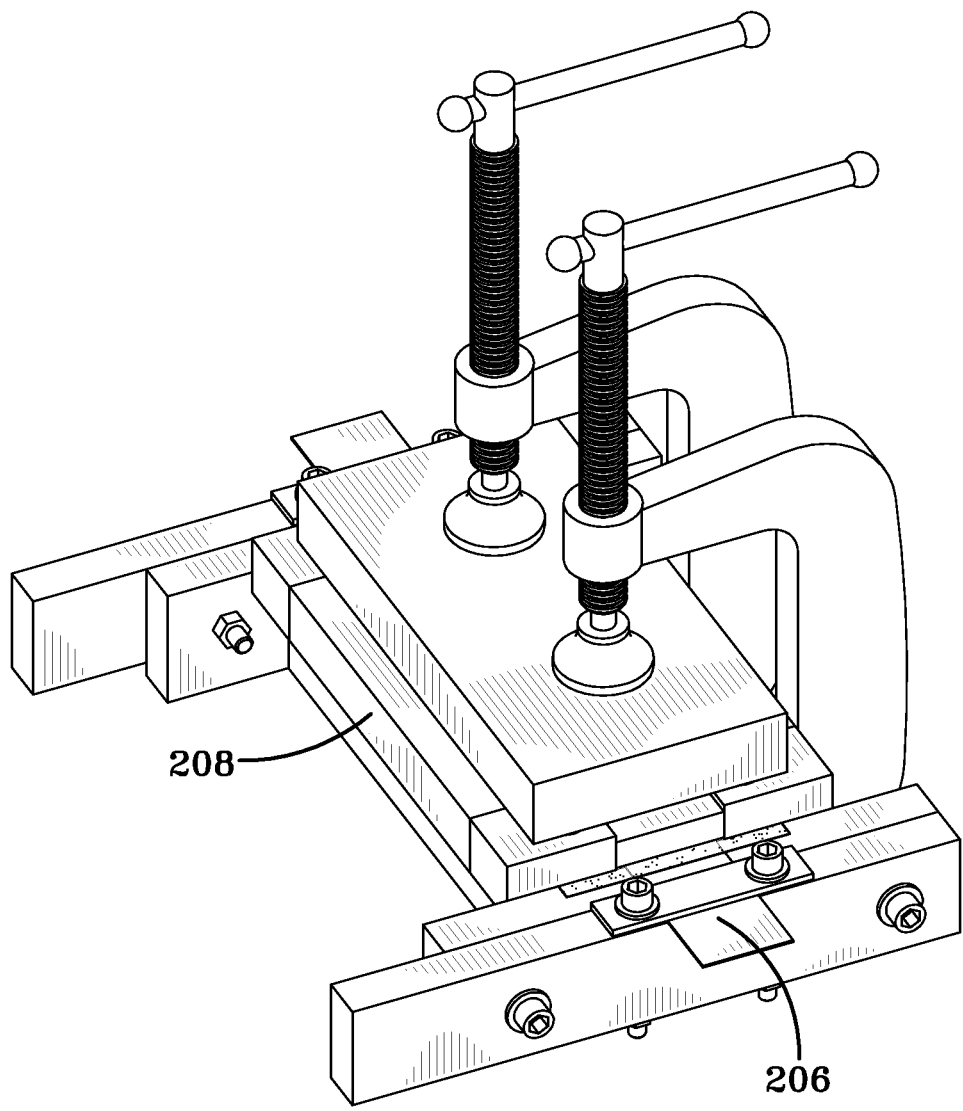
Figure 9C:
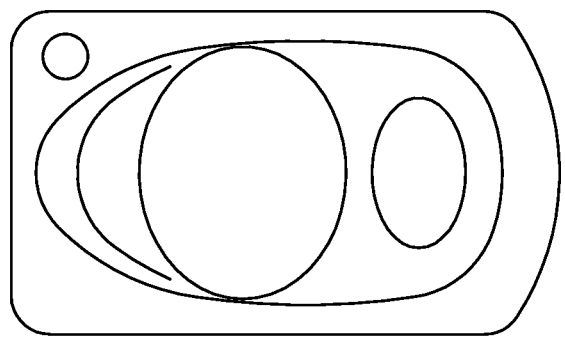
FIG. 9 shows photos of titanium sheets formed into a cell phone die using vaporizing foil-polyurethane pad forming matter.
Figure 9B:
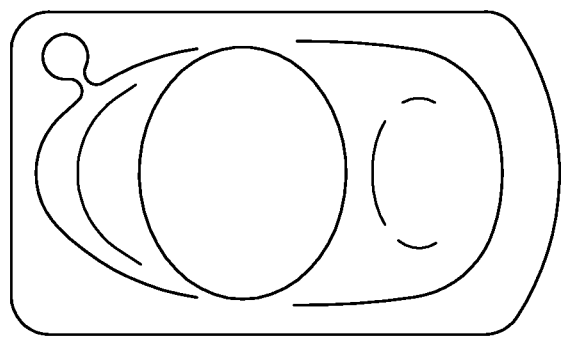
Figure 9A:
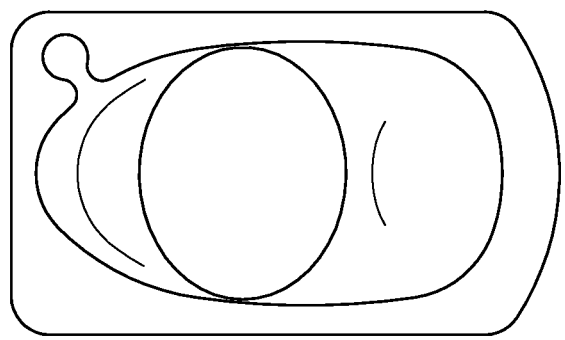

Adaptation of this set up for a real manufacturing product (cell phone casing) was also done as shown in FIG. 8. Commercially pure titanium sheets were formed using this method and almost full conformance with the die shape was obtained. There were some tearing at the corners but, that can be corrected for by performing sheet in a quasistatic press, and then giving it the impulse by vaporizing the foil. Results from single and double step process are shown in FIG. 9.

This section details the invention in accordance with the aforementioned summary and the way it is set up in the form of a bench prototype.

Figure 10:
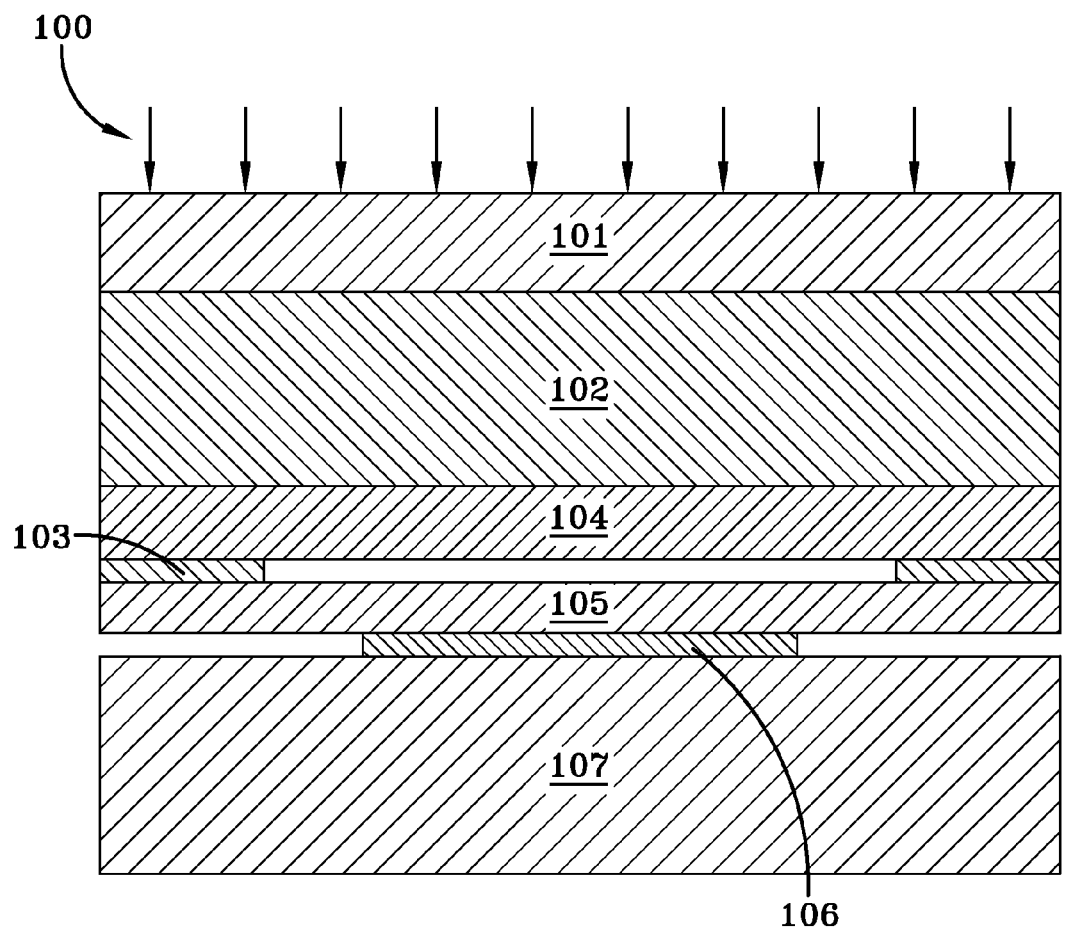
FIG. 10 is a schematic for implementation of collision welding of sheet metals using electrically driven vaporizing foils.

FIG. 10 depicts a system for implementing collision welding by using the pressure created by an insulated aluminum foil 106 to drive a flyer plate 105 towards a target plate 104. The figure is a longitudinal cross section of the set up. So the aluminum foil 106 is connected to one terminal of a capacitor bank in front of the figure and to another terminal at the back of the FIG. 10. The aluminum foil 106 is insulated from its surroundings using a polyimide tape. When a high transient current is passed through aluminum foil 106, it vaporizes in a few microseconds. The aluminum vapors also forms oxides and nitrides, the reactions for which are very exothermic and cause further expansion of gases. The gases cannot move the heavy backing block 107. So they force the flyer plate 105 upward. The flyer plate travels a certain distance and impacts the target plate 104 at a certain angle. The distance of travel and impact angle is determined by the thickness of the stand-off sheet 103. The flyer plate 105 or target plate 104 could have engraved surface features to ensure oblique impact. The target plate is backed by a steel block 102. The whole set up is clamped together with the help of clamping force 100 provided by either through bolts or a hydraulic press.

Figure 11:
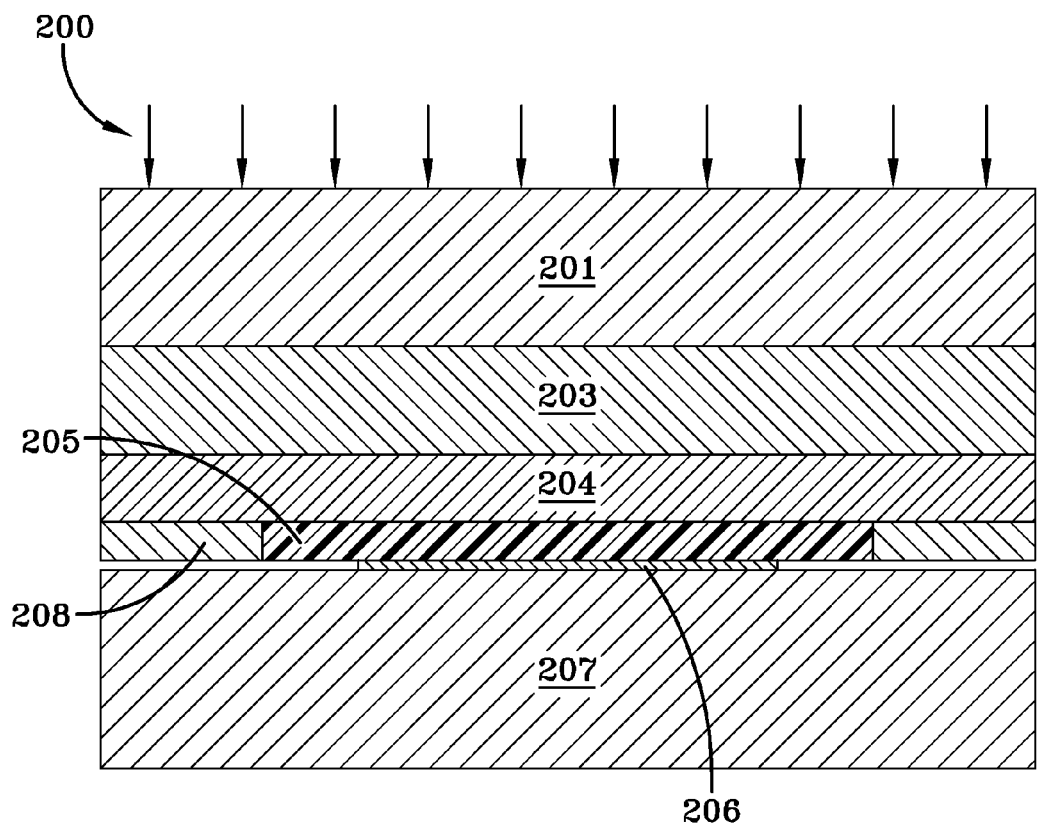
FIG. 11 is a schematic for implementation of impulse forming of sheet metal using electrically driven vaporizing foils with intermediate elastomer layer and with or without augmentation.

FIG. 11 represents a system for implementing impulse forming by using augmented or non augmented foil vaporization by a capacitor bank discharge. The set up is similar to that for collision welding except for a few modifications. There is a layer of polyurethane pad 205 between the aluminum foil 206 and sheet metal 204. Once the foil vaporizes the aluminum vapors react with oxygen and nitrogen to produce more heat. Besides, the pressure created from this rapid vaporization causes detonation of oxidizer-fuel mixture (potassium chlorate and kerosene oil in current set up) leading to even higher pressures. The pressure wave travels through the polyurethane layer and pushes the sheet metal 204 into a perforated plate/female die 203, thereby forming the sheet metal 204. The perforated plate/die is backed by a heavy backing block 202. Like welding set up, clamping force 200 provides a compressive force in the vertical direction. The polyurethane pad 205 may be placed in a steel channel 208 to ensure the pressure wave travels vertically and gets efficiently coupled to the sheet metal 204.

What is claimed is:

1. A method for forming a piece of a sheet metal, comprising the steps of:
   positioning a consumable body, comprising a metal, proximate to the piece of the sheet metal;
   accelerating the piece of the sheet metal by rapidly vaporizing the consumable body and directing the gas pressure generated by the rapidly-vaporized metal into the piece of the sheet metal; and
   colliding the accelerated piece of the sheet metal into a stationary body, resulting in the formed piece of sheet metal.

2. The method of claim 1, wherein:
   the consumable body comprises a metal foil.

3. The method of claim 1, wherein:
   in the colliding step, the stationary body is a die and the piece of sheet metal is deformed by the collision to create a desired shape or surface structure.

4. The method of claim 1, wherein:
   in the colliding step, the stationary body is a die that contains holes, such that-the piece of sheet metal is perforated or sheared by the collision to create a desired hole or series of holes.

5. The method of claim 1, wherein:
   in the colliding step, the stationary body is a further piece of metal and the piece of sheet metal is welded thereto by the collision.

6. The method of claim 3, wherein:
   the piece of sheet metal and the further piece of metal are of dissimilar metals.

7. The method of claim 1, wherein:
   in the accelerating step, the piece of sheet metal attains a velocity in the range of 200 to 2000 m/s.

8. The method of claim 2, wherein:
   the metal foil in the consumable body comprises aluminum.

9. The method of claim 1, wherein:
   the consumable body further comprises a layer of an unstable energetic chemical mixture.

10. The method of claim 1, wherein:
    the unstable energetic chemical mixture comprises kerosene oil and potassium chlorate.

11. The method of claim 8, wherein:
    the consumable body further comprises a layer of a polyurethane elastomer.

12. The method of claim 9, wherein:
    the consumable body further comprises a layer of a polyurethane elastomer, the unstable energetic chemical mixture, arranged between the metal foil and the polyurethane elastomer.

13. The method of claim 1, wherein:
    the consumable body comprises two layers of metal foil or mesh, with an intermediate layer of an oxidizer fuel mixture.

14. The method of claim 13, wherein:
    the oxidizer fuel mixture comprises kerosene oil and potassium chlorate.

15. The method of claim 1, wherein:
    the accelerating step is achieved by passing a high current rapidly into the foil.

16. The method of claim 15, wherein
    the high current is achieved by discharging a bank of capacitors.

17. The method of claim 1, wherein:
    the consumable body, the piece of sheet metal and the stationary body are arranged in that order between a pair of blocks of metal, each of which significantly outweighs the piece of sheet metal, thereby directing the vaporized stream towards the piece of sheet metal and accelerating the piece of sheet metal towards the stationary body.

18. A method for forming a collision weld between a piece of a sheet metal and a further piece of metal, comprising the steps of:
    positioning a consumable body, comprising an aluminum foil, proximate to the piece of the sheet metal;
    accelerating the piece of the sheet metal by discharging a transient high current into the consumable body, which is rapidly vaporized and directs a stream of the rapidly-vaporized metal into the piece of the sheet metal, accelerating the piece of the sheet metal to a velocity in the range of 200 to 2000 m/s; and
    colliding the accelerated piece of the sheet metal into the further piece of metal, resulting in the collision weld.

* * * * *